Figure 1:
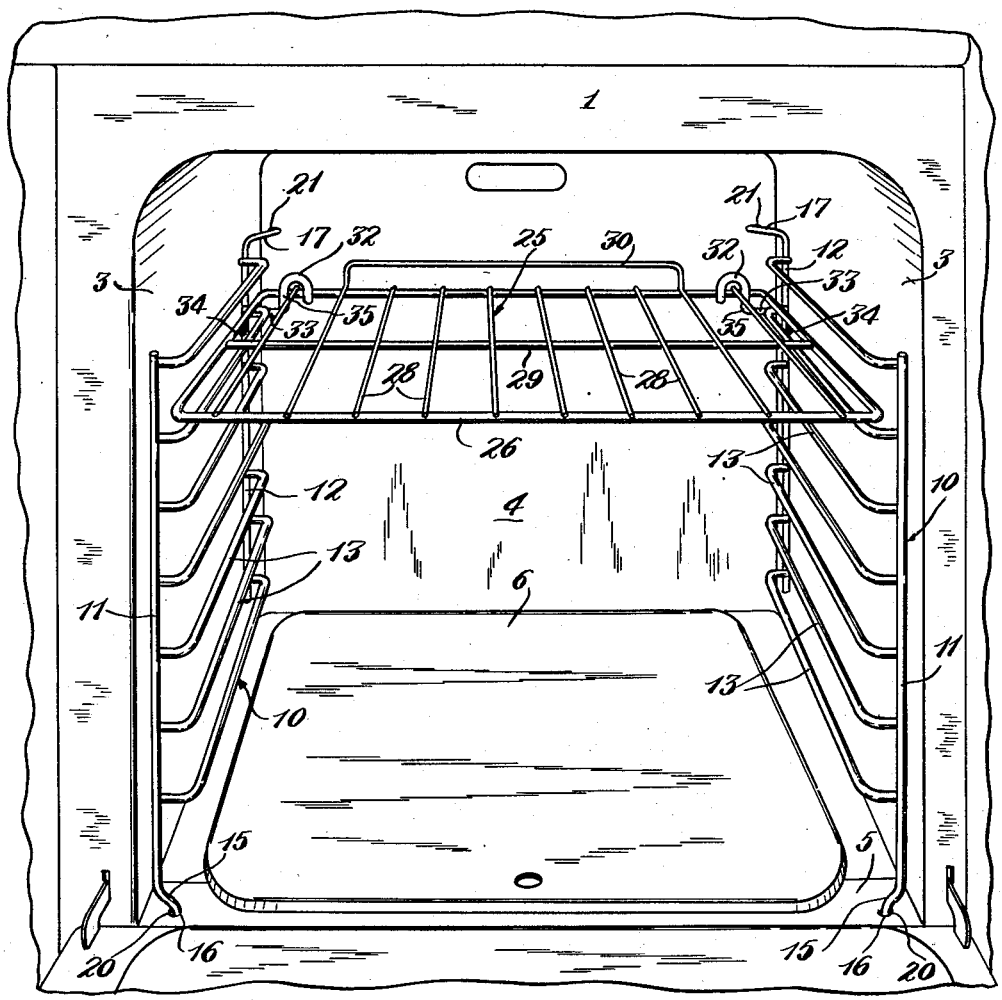

March 2, 1954     L. S. CHADWICK ET AL     2,671,004
RACK GUIDE FOR COOKING OVENS Filed Oct. 28, 1949     2 Sheets-Sheet 1

INVENTORS
Lee S. Chadwick
BY Marc Resek

West + Oldham
Attorneys

March 2, 1954  L. S. CHADWICK ET AL  2,671,004
RACK GUIDE FOR COOKING OVENS
Filed Oct. 28, 1949  2 Sheets-Sheet 2

INVENTORS
Lee S. Chadwick and
BY   Marc Resek

West + Oldham
Attorneys

Patented Mar. 2, 1954

2,671,004

UNITED STATES PATENT OFFICE 2,671,004

RACK GUIDE FOR COOKING OVENS

Lee S. Chadwick, Shaker Heights, and Marc Resek, Cleveland Heights, Ohio, assignors to Perfection Stove Company, Cleveland, Ohio, a corporation of Ohio Application October 28, 1949, Serial No. 124,158

5 Claims. (Cl. 312—350)

1

This invention pertains to cooking ovens, particularly of the domestic class, and has to do especially with improvements in the racks and rack guides that are used in such ovens.

Modern practice is to coat the interior surfaces of the walls of ovens of gas and electric cooking stoves or ranges with vitreous enamel. It is desirable to make the vitreous coating of white enamel, but in general this finish has not been practical due to the usual protuberances for supporting the racks. The absence of protuberances on the oven walls facilitates the enameling of the walls in the first instance, reduces the possibility of subsequent chipping of the enamel, and not only makes a white enamel practical but makes easier the cleaning of the ovens when in service. Also, when the walls are plain, there is less opportunity for foreign matter to lodge upon and adhere to the walls.

An object of our invention, therefore, is to provide an oven structure including walls that are devoid of protuberances, and rack guides that detachably interlock with the oven structure in such manner as to be firmly supported adjacent the side walls of the oven compartment and that are capable of being easily and quickly emplaced, and, with equal facility, removed for the purpose of cleaning the oven.

Another object is to provide an oven structure including sheet metal walls, and rack guides therefor, wherein each rack guide is in the nature of a comparatively rigid, generally rectangular unit having a two-point attachment to the oven structure, the points of attachment being on an axis substantially diagonal of the unit and so related to the adjacent side wall of the oven that the rack guide is held under some degree of stress against said wall, any tendency of the rack guide to rock upon said axis being opposed by contact of the remote corner portions of the guide with the wall.

Another and important object of our invention is to provide an oven, and removable rack guides therefor, wherein the rack guides cooperate with the oven structure in a manner to practically eliminate any possibility of the rack guides being accidentally displaced, thus promoting safety.

Further objects are the attainment of attractiveness of appearance, simplicity of construction and fabrication, ease of assembly, and economy of manufacture, in devices of the class to which the invention relates.

The foregoing and other objects and advantages will appear as we proceed to describe our invention, in detail, by the use of reference characters in connection with the accompanying drawings, and wherein like characters designate like parts in the several views.

Figure 2:
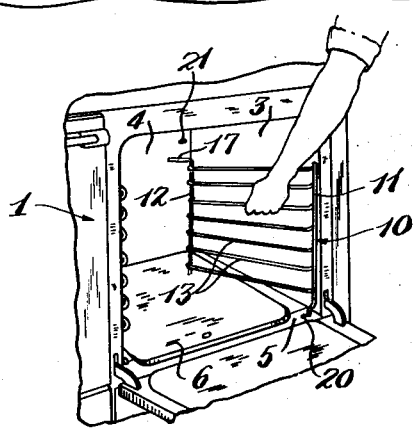
Figure 3:
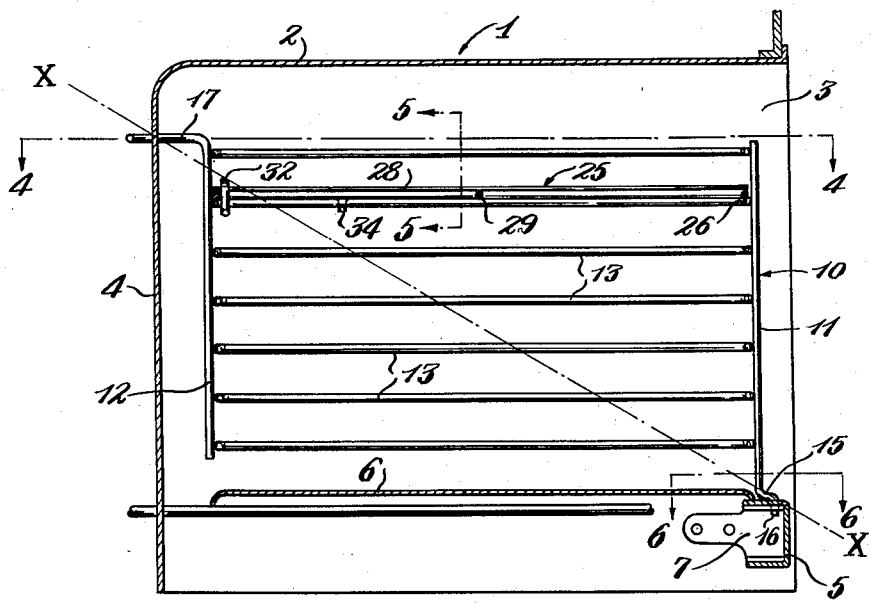
Figure 4:
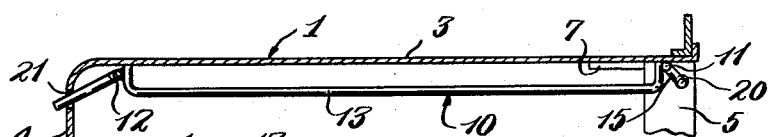
Figure 5:
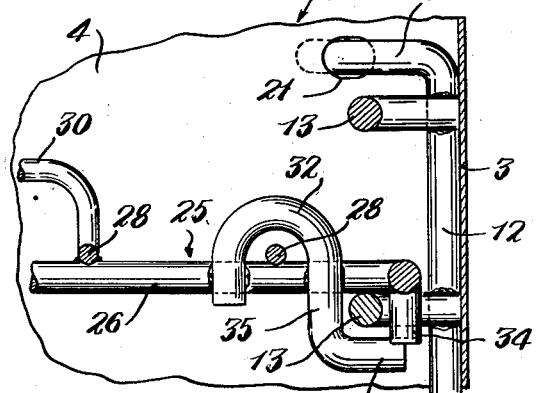
Figure 6:
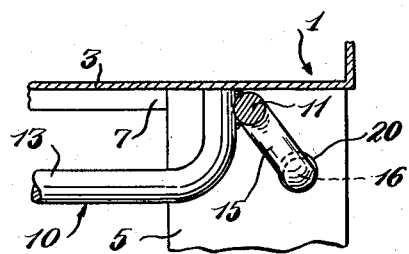

In the drawings, Fig. 1 is a fragmentary perspective view of a cooking stove or range, looking directly into an oven incorporating our improvements; Fig. 2 is a somewhat similar view showing one of the rack guides being removed or emplaced; Fig. 3 is a vertical section through the oven, from front to rear, showing a rack and one of the rack guides in position in the oven; Fig. 4 is a horizontal section through one side of the oven, the plane of section being indicated by the line 4—4 of Fig. 3; and Figs. 5 and 6 are enlarged sectional details on the lines 5—5 and 6—6, respectively, of Fig. 3.

The oven structure, designated generally by the reference numeral 1, includes a top wall 2, side walls 3 and a rear wall 4. The bottom of the oven compartment is defined by a member 5 and a removable panel 6. The member 5 is in the form of a channel which is connected at its ends, through the medium of brackets 7, to the side walls 3.

The rack guides are designated, generally, by the reference numeral 10. Each consists of a front member 11, a rear member 12, and a plurality of rails 13. The members 11 and 12 and the rails 13 are preferably made of relatively heavy rods. Stiff rods of about a quarter inch diameter have been found especially suitable. The ends of the rails 13 are turned laterally in the same direction at right angles to their body portions and are welded to the members 11 and 12. The front member 11 has a right angular bend at its lower end to provide a foot 15, and therebeyond is turned downwardly to form a toe 16. The front member 11 terminates at its upper end in about the plane of the top rail 13, while the lower end of the rear member 12 bears approximately the same relation to the bottom rail. The upper end of the member 12 is extended rearwardly to provide a finger 17. In practice, this finger is disposed at an angle of about 18° to the vertical plane of the rails 13, while the foot 15 extends at an angle of about 45° to said vertical plane.

The top flange of the channel that forms the bottom member 5 is provided with an aperture 20 adjacent each of its ends for the reception of the toe 16 of one of the rack guides, and an aperture 21, preferably in the form of a short horizontally disposed slot, is made in the back wall 5 in proximity to each of the side walls 3 for the reception of the finger 17 of the rack guide associated with the latter wall.

To emplace a rack guide within the oven compartment, it may be held in the manner shown in Fig. 2, and the finger 17 is projected through the aperture 21. As the guide is swung toward the side wall, it first contacts the latter along the junction between the rear member 12 and the adjacent ends of the rails 13, and either the rack guide or the sheet metal side wall 3, or both, preferably is or are subjected to some slight degree of elastic deformation as the front end of the guide is swung into contact with said wall 3 and the toe 16 projected through the aperture 20. Thus each rack guide is held in firm contact with the adjacent side wall. This action is further enhanced by the fact that the two points of attachment between the rack guide and oven structure are on an axis approximately diagonal of the substantially rectangular rack guide unit, which axis is represented by the line X—X in Fig. 3. Therefore, any tendency for said unit to rock on the axis X—X is opposed by contact of its top front corner and lower rear corner with the oven wall.

To remove the rack guide from the oven compartment, the foregoing operation is reversed. With the rack guides removed, the walls of the oven compartment may be readily cleaned.

A shelf or so-called rack 25, of which there may be any desired number, is adapted to be slidably supported upon the corresponding rails 13 of the opposed rack guides 10. Each rack consists of a rectangular frame 26, that may be constructed of rod of the same quality and diameter as that from which the rack guides are fabricated, and welded to the front and rear cross members of the frame are the opposite ends of elements 28, preferably consisting of rod or wire of a lesser diameter than the previously mentioned rod. Intermediate their ends, the elements 28 are supported by, and preferably welded to, a cross member 29. To prevent utensils or other objects from sliding off the rack at the rear, especially when the rack is slid forwardly to extended position, a cross bar 30 is provided and this, in the present instance, is formed of an integral part of the rod or wire that form certain of the elements 28—in the present instance, the second ones from each side of the rack. S-shaped members 32 are welded to the rear member of the rack frame, and horizontal end portions thereof provide lugs 33 that underlie the rails 13 upon which the sides of the rack rest. Some distance forwardly of the lugs 33 are stops 34 that depend from the side members of the frame 26. These stops are thus disposed within the spaces between the rails 13 and the adjacent side walls 3 and by engagement with the laterally turned front ends of the rails 13, limit the outward movement of the rack and thus determine its fully extended position. When in such position, the rack is prevented from tilting downwardly at its forward end by the engagement of the lugs 33 with the under side of the rail 13. Furthermore, under these conditions, the rack guides 10 are also held against accidental upward displacement at their rear ends by the engagement of the fingers 17 within the apertures 21 in the rear wall 4. The vertical branches 35 of the members 32, by contact with the rails 13, prevent lateral displacement of the rack. When it is desired to remove a rack from the oven compartment, it is only necessary to lift the front end of the rack and pull the rack forwardly so that the stops 34 will escape the outwardly turned front ends of the opposed rails 13 by which the rack is supported.

Having thus described our invention, what we claim is:

1. In combination, a structure enclosing an oven compartment and including substantially plane side walls for said compartment, and rack guides in the compartment adjacent said walls, each rack guide consisting of a rectangular unit entirely contained within said compartment and provided with a generally rearwardly extending holding part at its rear end and a substantially vertically extending holding part adjacent its forward end, said holding parts being at considerably different elevations, and the structure having forwardly opening apertures adjacent the rear of the oven compartment for the reception of the rearwardly extending holding parts of the rack guides, and apertures adjacent the front of the oven compartment whose axes are vertical and wherein the vertically extending holding parts of the rack guides are adapted to be engaged, said apertures being spaced a short distance from the side walls of the compartment, each rack guide being resilient and the corners thereof remote from an axis passing through the holding parts of the rack guide being spaced from the vertical plane of said axis toward the adjacent side wall a distance slightly greater than the beforementioned distance whereby, when the holding parts are engaged in the appropriate apertures, said corners of the rack guide will be yieldingly pressed against the adjacent side wall.

2. In combination, a structure enclosing an oven compartment and including a back wall and opposed side walls and a bottom member for said compartment, and rack guides adapted to be removably supported entirely within the compartment adjacent said side walls; each rack guide comprising a substantially vertical front member, a rear member approximately parallel to the front member, and a plurality of substantially horizontal guide rails connected at their ends to said front and rear members, the rear member incorporating a generally rearwardly extending holding part at its upper end, and the front member being provided at its lower end with a laterally extending foot and a toe depending therefrom, the back wall of the oven compartment having apertures spaced from the side walls for the reception of the aforesaid rearwardly extending holding parts, and the bottom member constituting a support for the feet of the front members of the rack guides and having apertures spaced from the side walls adjacent the front corners of the oven compartment for the reception of the aforesaid toes, areas of each rack guide remote from and on opposite sides of an axis passing through its holding part and toe engaging the adjacent side wall to hold the rack guide against rocking on said axis, and the presence of said holding part in the corresponding aperture of the back wall constraining the rear end of the rack guide against vertical movement.

3. In combination, a structure enclosing an oven compartment and including a back wall and opposed side walls and a bottom member for said compartment, and rack guides adapted to be removably supported entirely within the compartment adjacent said side walls; each rack guide comprising a plurality of substantially horizontal parallel rails constructed of rod and having their ends turned outwardly, a vertical front member also constructed of rod and to which the forward faces of the outturned front ends of the rails are welded, the lower end of the front member being extended laterally to form a foot and thence downwardly to provide a toe, and a rear member approximately parallel to the front member and constructed of rod and to which the rearward faces of the rear ends of the rails are welded, the upper end of the rear member being inclined inwardly and rearwardly to provide a finger, the aforesaid back wall having apertures spaced from the side walls for the reception of the fingers of the opposed rack guides, and said bottom member having apertures spaced from the side walls adjacent the front corners of the compartment for the reception of the toes of the rack guides, the extremities of the rails and said front and rear members of the rack guide being in close proximity to the side walls when the finger and toe occupy the respective corresponding apertures in the back wall and bottom member.

4. The combination with a structure enclosing an oven compartment and including substantially plane side walls therefor, of rack guides contained with the compartment adjacent said walls; each rack guide being rectangular and resilient and provided with a holding part at its upper rear corner and a second holding part at its lower front corner whereby any tendency of the rack guide to rock will be about an axis extending substantially diagonally of the rack guide, and the structure having unobstructed apertures accessible from inside the compartment and wherein said holding parts are detachably engaged, said apertures being spaced a short distance from the side walls, and the corners of each rack guide remote from and on opposite sides of said axis being spaced in the direction of the adjacent side wall from the vertical plane of said axis a distance slightly greater than the aforesaid distance whereby, when the holding parts are engaged in the appropriate apertures, said corners of the rack guide will be yieldingly pressed against the adjacent side wall.

5. The combination with a structure enclosing an oven compartment and including substantially plane side walls therefor, of rack guides contained within the compartment adjacent said walls; each rack guide being rectangular and provided with a holding part at its upper rear corner and a second holding part at its lower front corner whereby any tendency of the rack guide to rock will be about an axis extending substantially diagonally of the rack guide, and the structure having unobstructed apertures accessible from inside the compartment and wherein said holding parts are detachably engaged, said apertures being spaced a short distance from the side walls, and the corners of each rack guide remote from and on opposite sides of said axis being spaced in the direction of the adjacent side wall from the vertical plane of said axis a distance substantially not less than the aforesaid distance whereby, when the holding parts are engaged in the appropriate apertures, the last mentioned corners of the rack guide will contact the adjacent side wall thereby to prevent the rack guide from rocking on the aforesaid axis.

LEE S. CHADWICK.
MARC RESEK.

References Cited in the file of this patent
UNITED STATES PATENTS

| Number | Name | Date |
| --- | --- | --- |
| 550,923 | Wells | Dec. 3, 1895 |
| 1,191,198 | Kuhn | July 18, 1916 |
| 1,787,022 | Seeley | Dec. 30, 1930 |
| 1,989,275 | Hatch | Jan. 29, 1935 |
| 2,113,544 | Haley | Apr. 5, 1938 |
| 2,393,536 | Horne | Jan. 22, 1946 |
| 2,420,173 | Hall | May 6, 1947 |